(12) United States Patent
Yoder

(10) Patent No.: US 9,593,792 B1
(45) Date of Patent: Mar. 14, 2017

(54) THREAD PROTECTORS

(71) Applicant: Michael E. Yoder, Sullivan, IL (US)

(72) Inventor: Michael E. Yoder, Sullivan, IL (US)

( * ) Notice: Subject to any disclaimer, the term of this patent is extended or adjusted under 35 U.S.C. 154(b) by 79 days.

(21) Appl. No.: 14/835,776

(22) Filed: Aug. 26, 2015

Related U.S. Application Data

(62) Division of application No. 14/048,220, filed on Oct. 8, 2013, now Pat. No. 9,151,432.

(60) Provisional application No. 61/711,912, filed on Oct. 10, 2012.

(51) Int. Cl.
*F16L 55/115* (2006.01)

(52) U.S. Cl.
CPC ................. *F16L 55/1152* (2013.01)

(58) Field of Classification Search
CPC ...... F16L 55/11; F16L 55/1108; F16L 55/115; F16L 55/1152; F16L 55/24; F16L 57/005; F16L 57/06; F16L 35/00; F16L 58/18; F16L 58/182; F16L 2201/80; Y10T 29/4943; Y10T 29/49826; Y10T 29/49893; B65D 59/00; B65D 59/02; B65D 59/06; B65D 59/08
USPC ................................................. 138/96 R, 96 T
See application file for complete search history.

(56) References Cited

U.S. PATENT DOCUMENTS

| | | | |
|---|---|---|---|
| 2,225,754 A | 12/1940 | Mirfield | |
| 3,148,708 A * | 9/1964 | Panella | F16L 55/11 138/89 |
| 4,139,023 A * | 2/1979 | Turley | F16L 57/005 138/96 T |
| 4,239,062 A | 12/1980 | Callicoatte | |
| 4,349,048 A | 9/1982 | Clark | |
| 4,442,737 A | 4/1984 | Miner | |
| 4,487,228 A * | 12/1984 | Waldo | B65D 59/02 138/89 |
| 4,549,337 A * | 10/1985 | Newell | B29C 70/78 138/96 T |
| D284,265 S * | 6/1986 | Resan | D23/260 |
| 4,932,292 A | 6/1990 | Merrick | |
| D321,164 S * | 10/1991 | Gibson | D12/213 |
| D344,242 S * | 2/1994 | Weise | D10/80 |
| 5,813,104 A | 9/1998 | Quick | |
| 6,196,270 B1 * | 3/2001 | Richards | B65D 59/02 138/96 R |
| 6,250,337 B1 * | 6/2001 | Bevacco | F16L 55/1108 138/89 |
| 7,281,546 B2 | 10/2007 | Goodson et al. | |
| 7,857,007 B2 | 12/2010 | Kovacs, Jr. | |
| 8,011,391 B2 | 9/2011 | Heritier et al. | |
| 8,424,570 B2 * | 4/2013 | Baker | B65D 59/02 138/89 |

(Continued)

*Primary Examiner* — Jason L Vaughan
(74) *Attorney, Agent, or Firm* — Philip L. Bateman

(57) ABSTRACT

A thread protection assembly protects the exposed threads on the pin end and the box end of a section of pipe attached to a coupling. The assembly contains a pin end thread protector and a box end thread protector. The pin end thread protector has a cylindrical sleeve with internal threads adapted to mate with exposed external threads on the pin end of the pipe, an open end, and a closed end having an outwardly projecting hex head. The box end thread protector has a cylinder with external threads adapted to mate with the exposed internal threads on the box end of the coupling and a closed end having an outwardly projecting hex head.

18 Claims, 8 Drawing Sheets

(56) References Cited

U.S. PATENT DOCUMENTS

| | | | |
|---|---|---|---|
| 8,622,091 B2 * | 1/2014 | Yamamoto | F16L 57/005 138/145 |
| 8,752,454 B2 | 6/2014 | Friend et al. | |
| D733,847 S * | 7/2015 | Brown | D23/262 |
| 2004/0201131 A1 * | 10/2004 | Goodson | F16L 57/005 264/220 |
| 2005/0242587 A1 * | 11/2005 | Imai | F16L 57/005 285/390 |
| 2010/0163131 A1 * | 7/2010 | Fehr | F16L 55/1108 138/89 |
| 2012/0187127 A1 * | 7/2012 | Luppi | B65D 39/08 220/288 |
| 2013/0105028 A1 | 5/2013 | Lockard et al. | |

\* cited by examiner

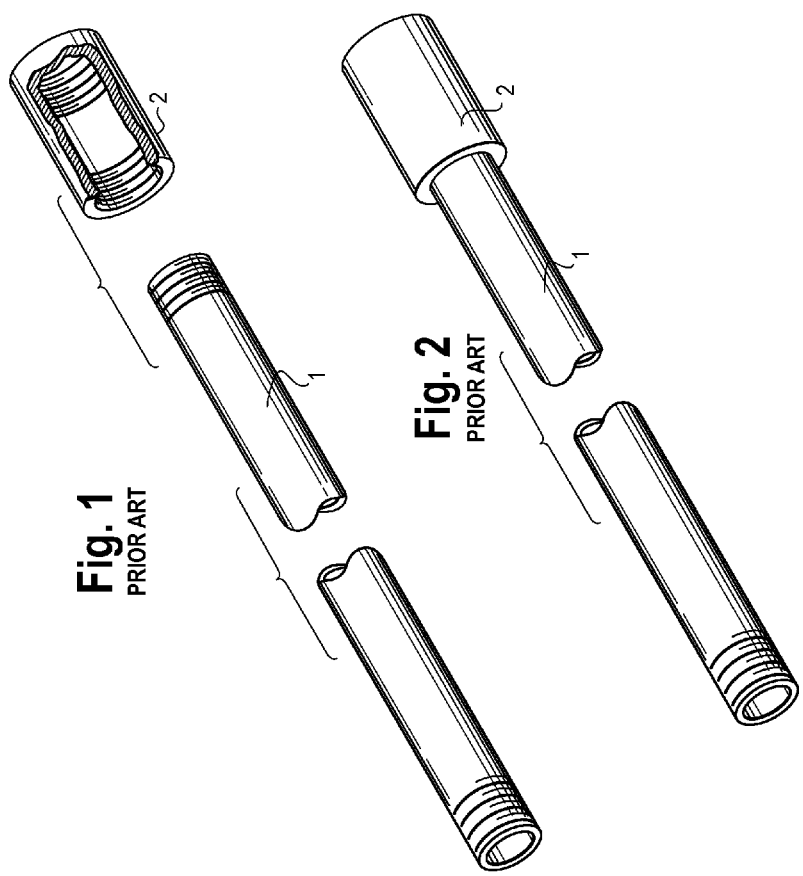

THREAD PROTECTORS

CROSS-REFERENCE TO RELATED APPLICATIONS

This application is a division of U.S. Utility patent application Ser. No. 14/048,220, Oct. 8, 2013, now pending, that claimed the benefit of U.S. Provisional Application Ser. No. 61/711,912, Oct. 10, 2012.

FIELD OF THE INVENTION

This invention relates to pipes and tubular conduits. More particularly, this invention relates to thread protectors for threaded pipe.

BACKGROUND OF THE INVENTION

Pipe having external threaded ends are manufactured in a wide variety of lengths, diameters, wall thicknesses, thread dimensions, and materials. The maximum length of individual sections of large diameter pipe for industrial use is generally about thirty to forty feet because of constraints in transporting the pipe from the point of manufacture to the point of use. When a very long pipe is needed, it is generally constructed by connecting multiple sections of pipe with short sleeves having internal threads known as couplings. It is common for pipe manufacturers to ship sections of pipe with a coupling already connected to one end (referred to herein as a pipe section-coupling assembly). FIG. 1 shows a section of pipe 1 and a coupling 2 before connection. FIG. 2 shows the section of pipe and coupling connected together for shipment.

Pipes having lengths of thousands of feet are commonly constructed in this way for use as drill pipe, tubing, conductor pipes, and casing in the oil drilling industry. The pipe sections and couplings are sometimes referred to as oil field tubular goods (OFTG) or oil country tubular goods (OCTG). The pipe sections and couplings have diameters of about two inches to three feet. Diameters of about 6 inch are the most common. The American Petroleum Institute (API) and other organizations have established standards for such products.

The external (male) threads of the pipe and the internal (female) threads of the coupling of a pipe section—coupling assembly can be damaged by impact during shipment and by corrosion if exposed to the elements for a long period of time. If the threads are damaged, the affected pipe or coupling may be difficult or impossible to connect. To prevent damage, pipe manufacturers commonly install cap-like protectors on the free, male ends of the pipes (commonly known in the oil industry as the pin end) and plug-like protectors into the open, female ends of the couplings (commonly known in the oil industry as the box end). The terms "pin end thread protector" and "box end thread protector" are used hereinafter to refer to these products.

A variety of pin end thread protectors and box end thread protectors are commonly used for pipe thread protection. One common type of protector contains notches into which a straight bar can be placed and rotated to tighten or loosen. Examples of this type of thread protector are disclosed in Callicoatte, U.S. Pat. No. 4,239,062, Dec. 16, 1980; and Goodson et al., U.S. Pat. No. 7,281,546, Oct. 16, 2007. This type of protector suffers from several disadvantages. First, the notches are prone to breakage. Second, the repetitive installation and removal motion of rotating a straight bar can lead to carpal tunnel syndrome and other overuse injuries. Third, the protectors are typically installed by hand at the manufacturing site as pipe section-coupling assemblies roll down transversely on a roller track. The person installing them runs the risk of having his hands pinched or otherwise injured by an adjacent pipe section-coupling assembly. Fourth, the torque applied varies when installing the protectors at the manufacturing site. Fifth, the protectors can be very difficult to remove at the point of use, especially in cold conditions when the protectors have been installed with excessive torque. Sixth, the difficulty of removal in very cold conditions often leads workers to use solvents to loosen the threads and torches to expand the plastic protectors. These steps are time-consuming and dangerous.

Other types of thread protectors are disclosed in Mirfield, U.S. Pat. No. 2,225,754, Dec. 24, 1940; Clark, U.S. Pat. No. 4,349,048, Sep. 14, 1982; Waldo et al., U.S. Pat. No. 4,487,228, Dec. 11, 1984; Kovacs, Jr., U.S. Pat. No. 7,857,007, Dec. 28, 2010; and Heritier et al., U.S. Pat. No. 8,011,391, Sep. 6, 2011; and Lockard et al., U.S. Pat. Appln. Publn. No. 2013/0105028, May 2, 2013. These thread protectors suffer from many of the same disadvantages of the notched protectors.

Special tools to install or remove thread protectors are disclosed in Miner, U.S. Pat. No. 4,442,737, Apr. 17, 1984; Merrick, U.S. Pat. No. 4,932,292, Jun. 12, 1990; Quick, U.S. Pat. No. 5,813,104, Sep. 29, 1998; and Friend et al., U.S. Pat. No. 8,752,454, Jun. 17, 2014. These specialized tools fit only a particular type of thread protector.

Accordingly, there is a demand for pin end thread protectors and box end thread protectors that are durable, that are reusable, that can be installed at a constant torque using commercially available tools, that can be easily removed even under cold conditions using commercially available tools, and that can be installed and removed with reduced risk of injury.

SUMMARY OF THE INVENTION

The general object of this invention is to provide improved pin end thread protectors and box end thread protectors. More particular objects are to provide thread protectors that are durable, that are reusable, that can be installed at a constant torque using commercially available tools, that can be easily removed even under cold conditions using commercially available tools, and that can be installed and removed with reduced risk of injury.

I have invented an improved thread protection assembly for protecting the exposed threads on a pin end and a box end of a section of pipe attached to a coupling. The assembly comprises pin end thread protector and a box end thread protector. The pin end thread protectors comprises a cylindrical sleeve with internal threads adapted to mate with exposed external threads on a pin end of a pipe, an open end, and a closed end having an outwardly projecting hex head. The box end thread protector comprises a cylinder with external threads adapted to mate with exposed internal threads on a box end of a coupling and a closed end having an outwardly projecting hex head.

The hex head thread protectors of this invention are durable, are reusable, can be installed at a constant torque using commercially available tools, can be easily removed even under cold conditions using commercially available tools, and can be installed and removed with reduced risk of injury.

BRIEF DESCRIPTION OF THE DRAWINGS

FIG. 1 is a perspective view of a prior art section of pipe and an unconnected coupling.

FIG. 2 is a perspective view thereof connected together.

DETAILED DESCRIPTION OF THE INVENTION

1. The Invention In General

Figure 3:
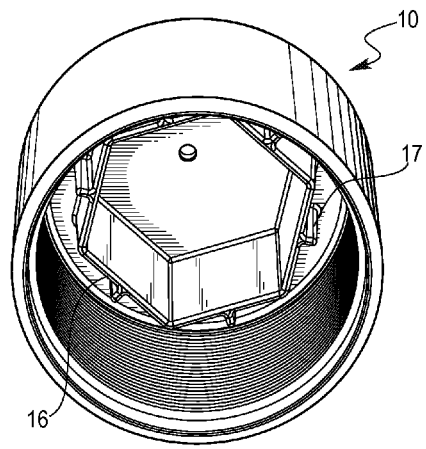
FIG. 3 is a perspective view of a first embodiment of the pin end thread protector of this invention.
Figure 4:
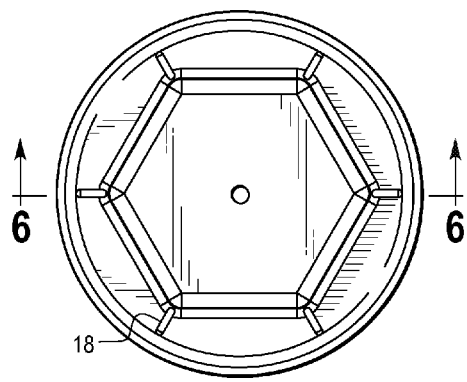
FIG. 4 is a top plan view thereof.
Figure 5:
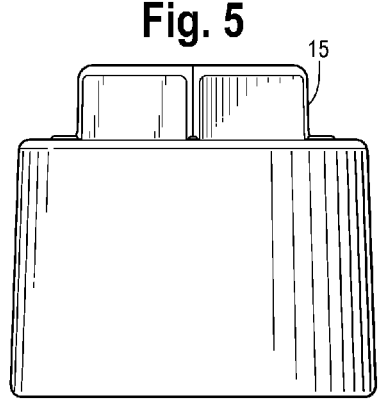
FIG. 5 is an elevation view thereof.
Figure 6:
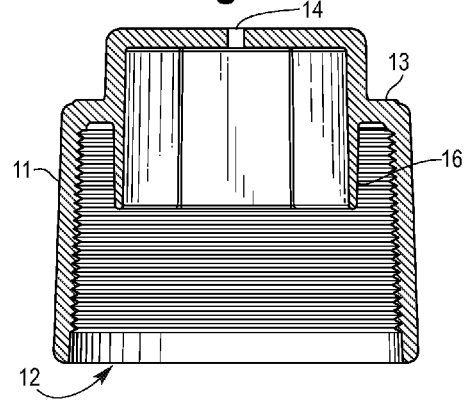
FIG. 6 is a sectional elevation view thereof taken along line 6-6 of FIG. 4.
Figure 7:
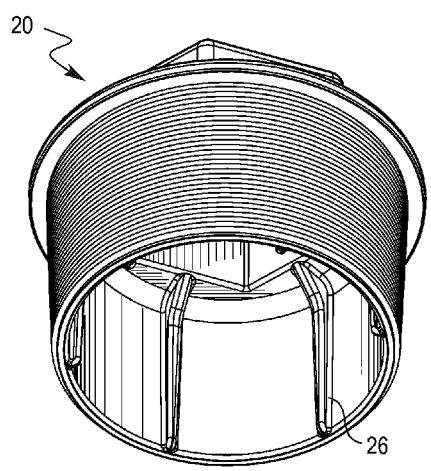
FIG. 7 is a perspective view of a first embodiment of the box end thread protector of this invention.
Figure 8:
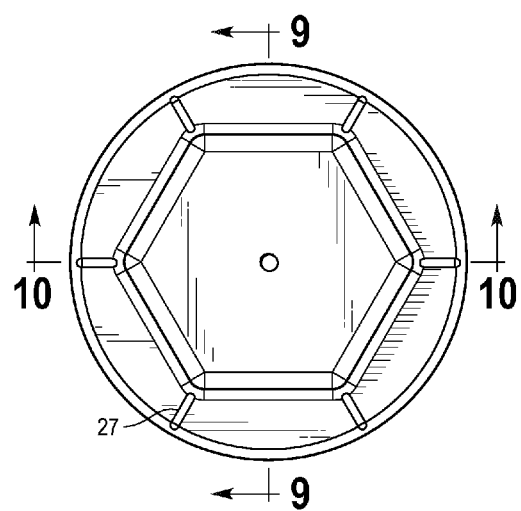
FIG. 8 is a top plan view thereof.
Figure 9:
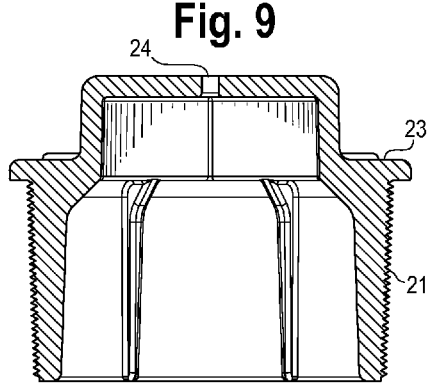
FIG. 9 is a sectional elevation view thereof taken along line 9-9 of FIG. 8.
Figure 10:
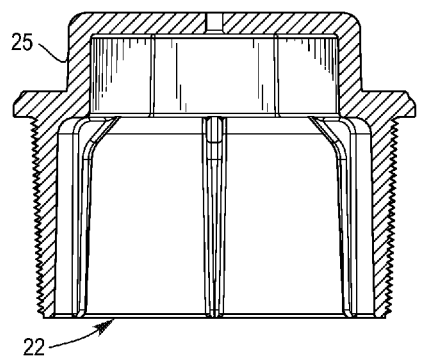
FIG. 10 is a sectional elevation view thereof taken along line 10-10 of FIG. 8.
Figure 11:
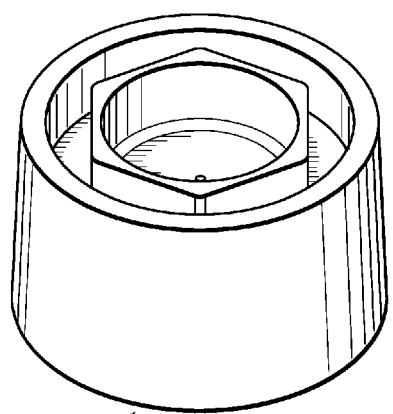
FIG. 11 is a perspective view of a second embodiment of the pin end thread protector of this invention.
Figure 12:
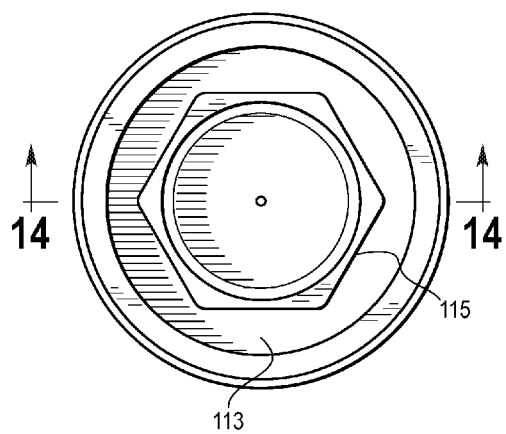
FIG. 12 is a top plan view thereof.
Figure 13:
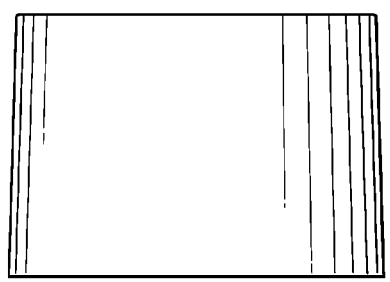
FIG. 13 is an elevation view thereof.
Figure 14:
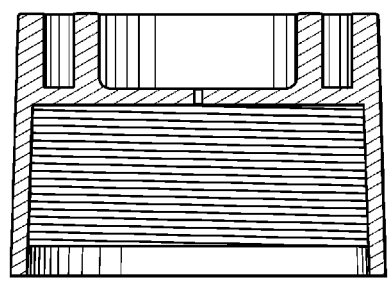
FIG. 14 is a sectional elevation view thereof taken along line 14-14 of FIG. 12.
Figure 15:
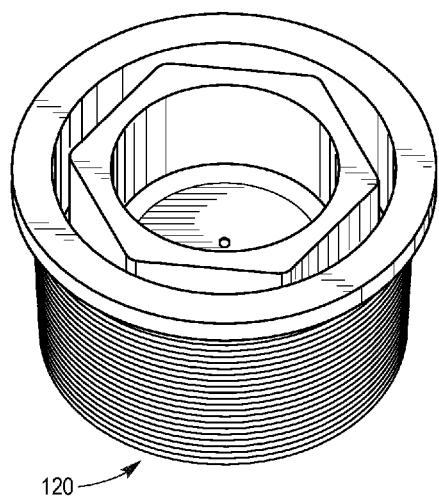
FIG. 15 is a perspective view of a second embodiment of the box end thread protector of this invention.
Figure 16:
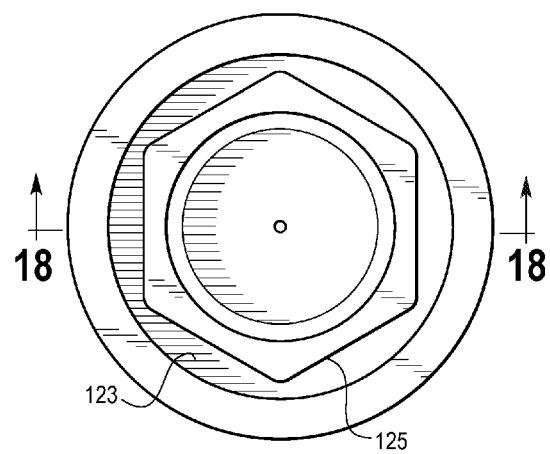
FIG. 16 is a top plan view thereof.
Figure 17:
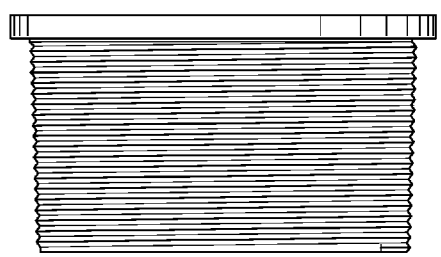
FIG. 17 is an elevation view thereof.
Figure 18:
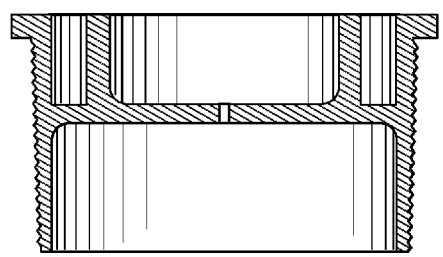
FIG. 18 is a sectional elevation view thereof taken along line 18-18 of FIG. 16.
Figure 19:
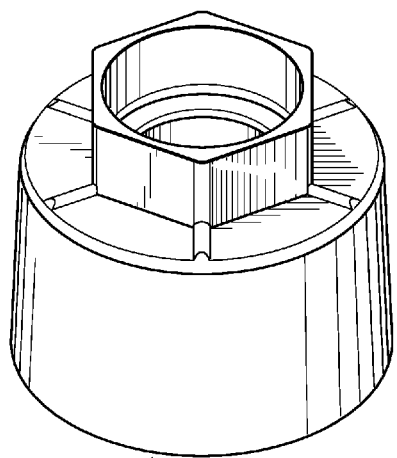
FIG. 19 is a perspective view of a third embodiment of the pin end thread protector of this invention.
Figure 20:
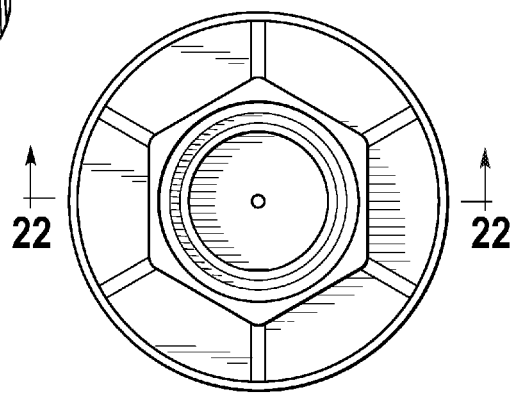
FIG. 20 is a top plan view thereof.
Figure 21:
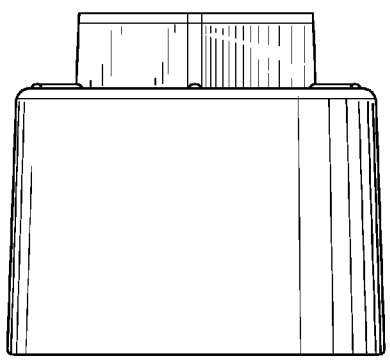
FIG. 21 is an elevation view thereof.
Figure 22:
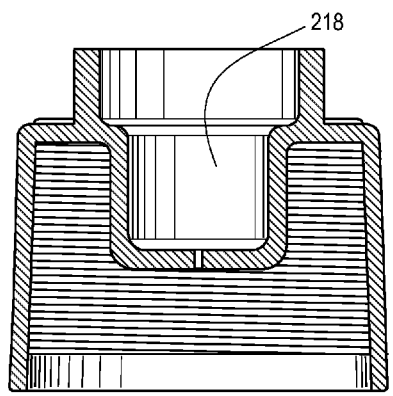
FIG. 22 is a sectional elevation view thereof taken along line 22-22 of FIG. 20.
Figure 23:
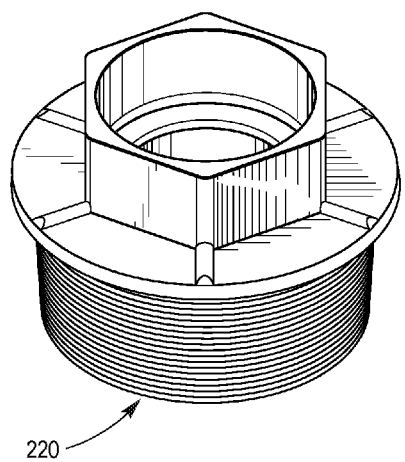
FIG. 23 is a perspective view of a third embodiment of the box end thread protector of this invention.
Figure 24:
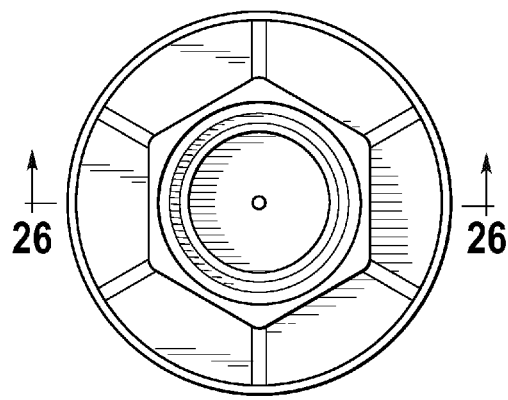
FIG. 24 is a top plan view thereof.
Figure 25:
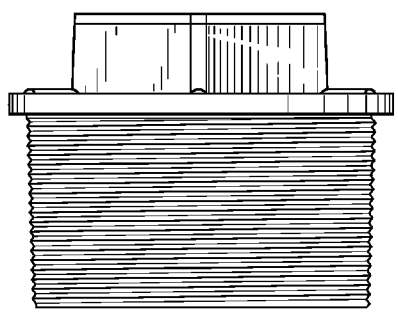
FIG. 25 is an elevation view thereof.
Figure 26:
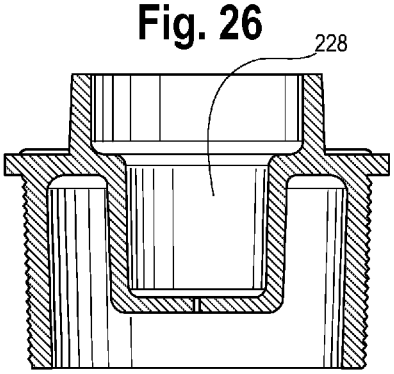
FIG. 26 is a sectional elevation view thereof taken along line 26-26 of FIG. 24.

The thread protection assembly of this invention is used to protect the exposed threads on a pipe section—coupling assembly (a section of pipe having a pin end attached to a coupling having a box end) as it is transported from a first site (typically a point of manufacture or distribution) to a second site (typically a rig site, a construction site, or other point of use) and as it is stored, at either or both sites. The thread protection system comprises a pin end thread protector and a box end thread protector, each of which includes a hex head. The pin end thread protector is installed on the pin end of the pipe and the box end thread protector is installed into the box end of the coupling. The protectors are preferably installed and removed with an impact wrench and a socket that mates with (fits tightly over) their hex heads.

2. The Pin End Thread Protector

A first embodiment of the pin end thread protector 10 of this invention is shown in FIGS. 3 to 6. This embodiment is preferred for general use. The pin end thread protector is a cap that comprises a cylindrical portion 11, the leading end 12 of which is open and the trailing end 13 of which is closed. The cylindrical portion of the pin end thread protector has internal threads for mating with the exposed external threads on the pin end of a pipe. The term "cylindrical" is used herein to mean that the cylindrical portion is generally cylindrical and it is understood that its internal threads may have a slight taper to conform to the taper of the threads on the pipe. For example, it is common for threads to have a taper of about 1 to 3 degrees. The dimensions of the pin end thread protector (diameter, length, etc.) and of its threads (diameter, pitch, threads per unit length, etc.) are also matters of choice that are dependent on the pipe to be protected.

As previously mentioned, the leading end of the pin end thread protector is open and the trailing end of the protector is closed. The term "closed" is used herein to mean that the trailing end of the protector is substantially closed. In the preferred embodiment, the closed end of the protector contains a small hole 14 to provide for the escape of moisture inside the pipe.

The closed, trailing end of the pin end thread protector has an outwardly projecting hex head 15. In the embodiment shown in FIGS. 3 to 6, the top of the hex head is flush and the hex portion extends downwardly into the cylindrical recess. The downward extension portion 16 makes it easier to remove the protector from the mold when manufactured by molding. In the embodiment shown in FIGS. 3 to 6, longitudinal spines 17 run down the middle of each of the six outward faces of the downward extending portion to increase strength. Similarly, radial ribs 18 extend outwardly along the top of the closed end from the bases of the six corners of the hex head to increase strength. The size of the hex head (the distance between opposing faces) is preferably about 50 to 80 percent of the diameter of the end of the protector. If the size of the hex head is less than about 50 percent, the amount of torque that can be applied decreases. If the size of the hex head is greater than about 80 percent, a socket lacks a sufficient base and it becomes more difficult to align the socket onto the hex head.

The pin end thread protector is formed of a durable, waterproof material. The protector is preferably molded of a thermoplastic material such as polyethylene, polypropylene, polyurethane, polyvinylchloride, styrene-butadiene copolymer, polycarbonate, or the like. Polypropylene is especially preferred because of its low coefficient of thermal expansion. As a result, polypropylene protectors contract little even at very low temperatures making them more easily removed at job sites.

3. The Box End Thread Protector

A first embodiment of the box end thread protector 20 of this invention is shown in FIGS. 7 to 10. The box end thread protector is a plug that comprises a cylindrical portion 21 having external threads. The external threads mate with the exposed internal threads on the box end of a coupling. The term "cylindrical" is used herein to mean that that the protector is generally cylindrical and that its external threads may have a slight taper to conform to the threads of the coupling. The dimensions of the protector (diameter, length, etc.) and of its threads (diameter, pitch, threads per unit length, etc.) are also matters of choice that are dependent on the coupling to be protected.

In the first embodiment shown in FIGS. 7 to 10, the box end thread protector has an open leading end 22 to avoid the problem of air pockets during molding and to reduce the amount of material and cost. The embodiment shown is hollow. In other words, the underside of the trailing end 23 (the hex head top) can be viewed from the open leading end of the protector. If desired, the box end protector is solid or has a closed leading end.

The trailing end of the box end thread protector is closed. The term "closed" is used herein to mean that the protector is substantially closed and that a small hole 24 may be included to provide for the escape of moisture inside the coupling.

The closed end of the box end thread protector has an outwardly projecting hex head 25. In the embodiment shown in FIGS. 7 to 10, the top of the hex head is flush. In the embodiment shown in FIGS. 7 to 10, longitudinal spines 26 run down the interior of the cylindrical portion to increase strength. Similarly, radial ribs 27 extend outwardly from the corners of the hex head to increase strength. The size of the hex head on the box end thread protector is preferably the same as the size of the hex head on the pin end thread protector so that one socket can be used to install and remove both. In the embodiment shown in FIGS. 7 to 10, the closed end is unthreaded and has a diameter slightly greater than the threaded portion, thus forming a circular flange.

The box end thread protector is formed of a durable, waterproof material. The protector is preferably molded of a thermoplastic material such as polyethylene, polypropylene, polyurethane, polyvinylchloride, styrene-butadiene copolymer, polycarbonate, or the like. As previously mentioned, polypropylene is most preferred because of its low coefficient of thermal expansion.

4. Second Embodiment

A second embodiment of the pin end thread protector 110 is shown in FIGS. 11 to 14 and a second embodiment of the box end thread protector 120 is shown in FIGS. 15 to 18. The second embodiments are similar to the first embodiments except the closed ends 113 and 123 and the hex heads 115 and 125 are recessed. While the hex heads of this embodiment project outwardly from the closed ends, the topes of the hex heads do not extend past the tops of the cylinders. The recessed position of the hex heads minimizes the risk of damage during shipment from the point of manufacture to the point of use of the pipe section-coupling. There is sufficient space between the outside of the hex heads and the surrounding wall to accommodate a socket of the type shown in FIG. 27.

5. Third Embodiment

A third embodiment of the pin end thread protector 210 is shown in FIGS. 19 to 22 and a second embodiment of the box end thread protector 220 is shown in FIGS. 23 to 26. The third embodiments are similar to the first embodiments except there are deep recesses 218 and 228 and in the interiors of the hex heads. The recesses accommodate cylindrical prongs that are commonly used to move the pipe section—coupling assemblies at the manufacturing or distribution site and at the rig or construction site.

6. Use

Figure 27:
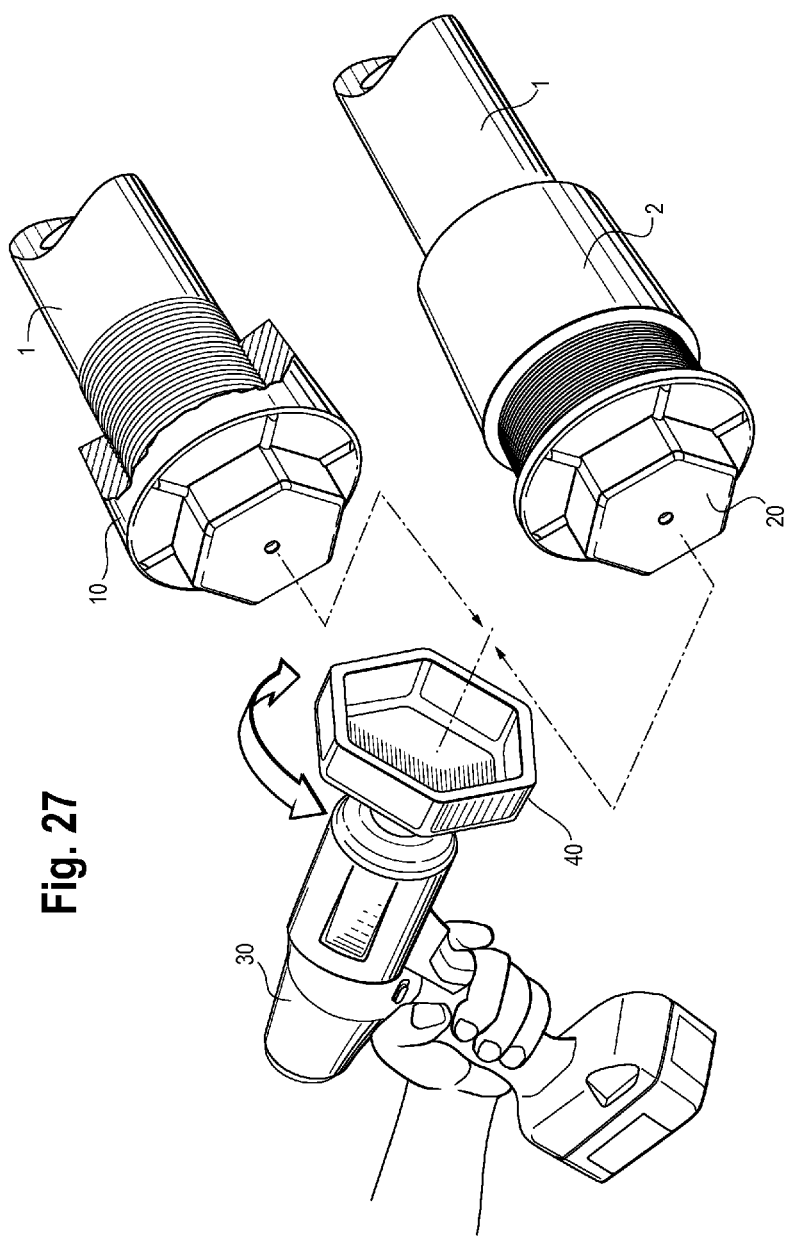
FIG. 27 is a perspective view of an impact wrench with socket for use in installing or removing the thread protectors.

The thread protectors are generally installed on pipe section—coupling assemblies at the point of manufacture or distribution. The protectors are preferably installed using an impact wrench or the like fitted with a socket of the appropriate size. Referring now to FIG. 27, an impact wrench 30 with a socket 40 is advantageously used to install and remove both the pin end thread protector and the box end thread protector. Impact wrenches and sockets are widely available commercial products. The torque applied when installing is sufficient to ensure that the protectors remain in place during transport, but is not so much that the protectors are overly difficult to remove. Installing the protector with an impact wrench is fast and safe.

After the protectors are installed, the pipe section—coupling assemblies are transported to the rig or construction site. If the protectors are of the deep recess embodiment, prongs are conveniently used to handle the assemblies.

The protectors are generally removed from the pipe section—coupling assemblies at the rig or construction site. The protectors are preferably removed using an impact wrench or the like fitted with a socket of the appropriate size. The protectors are preferably saved and returned to the manufacturer or distributor for reuse.

The use of the thread protectors reduces the risk of injury in several ways. First, use of the thread protectors with an impact wrench greatly reduces the risk of carpal tunnel syndrome and other repetitive, overuse injuries. Second, use of the thread protectors with an impact wrench reduces the risk of the hands being pinched or otherwise injured by adjacent pipe sections. And third, use of the thread protectors with an impact wrench eliminates the need for solvents, torches, and other dangerous practices.

I claim:

1. A thread protection assembly for protecting the exposed threads on a pin end and a box end of a section of pipe attached to a coupling, the assembly comprising:
   (a) a pin end thread protector comprising:
      (i) a cylindrical sleeve with internal threads adapted to mate with exposed external threads on a pin end of a pipe;
      (ii) an open end; and
      (iii) a closed end having an outwardly projecting hex head; and
   (b) a box end thread protector comprising:
      (i) a cylinder with external threads adapted to mate with exposed internal threads on a box end of a coupling;
      (ii) a closed end having an outwardly projecting hex head; and
   wherein the hex heads of the protectors each have six corners with bases intersecting with the closed ends of the protectors, wherein the closed ends of the protectors have upper surfaces, and wherein radial ribs extend outwardly along the upper surfaces from the base of each corner of the hex heads.

2. The thread protection assembly of claim 1 wherein the hex heads of the protectors each have three pairs of opposing faces, wherein the hex heads have a size defined by a distance between a pair of opposing faces, wherein the closed ends of the protectors each have a diameter, and wherein the size of the hex head of the pin end thread protector is about 50 to 80 percent of the diameter of the closed end of the pin end thread protector, and wherein the size of the hex head of the box end thread protector is about 50 to 80 percent of the diameter of the closed end of the box end thread protector.

3. The thread protection assembly of claim 1 wherein the protectors are made of polypropylene.

4. The thread protection assembly of claim 1 wherein the box end thread protector is hollow.

5. The thread protection assembly of claim 1 wherein the hex heads of the protectors each have an interior and wherein the interiors are recessed.

6. The thread protection assembly of claim 1 wherein the cylinder of the box end thread protector has an upper unthreaded portion that forms a circular flange having a greater diameter than the threads of the box end thread protector.

7. The thread protection assembly of claim 1 wherein the cylindrical sleeve of the pin end thread protector defines an interior and wherein the hex head of the pin end thread protector extends downwardly from the closed end into the interior.

8. The thread protection assembly of claim 1 wherein the closed ends of the protectors are recessed.

9. The thread protection assembly of claim 8 wherein the hex heads of the protectors have an interior and wherein the interiors are recessed.

10. A thread protection assembly for protecting the exposed threads on a pin end and a box end of a section of pipe attached to a coupling, the assembly comprising:
  (a) a pin end thread protector comprising:
    (i) a cylindrical sleeve with internal threads adapted to mate with exposed external threads on a pin end of a pipe;
    (ii) an open end; and
    (iii) a closed end having an outwardly projecting hex head; and
  (b) a box end thread protector comprising:
    (i) a cylinder with external threads adapted to mate with exposed internal threads on a box end of a coupling;
    (ii) a closed end having an outwardly projecting hex head; and
  wherein the hex heads of the protectors each have an interior and wherein the interiors are recessed.

11. The thread protection assembly of claim 10 wherein the hex heads of the protectors each have six corners with bases intersecting the closed ends of the protectors, wherein the closed ends of the protectors have upper surfaces, and wherein radial ribs extend outwardly along the upper surfaces from the base of each corner of the hex heads.

12. The thread protection assembly of claim 10 wherein the hex heads of the protectors each have three pairs of opposing faces, wherein the hex heads have a size defined by a distance between a pair of opposing faces, wherein the closed ends of the protectors each have a diameter, and wherein the size of the hex head of the pin end thread protector is about 50 to 80 percent of the diameter of the closed end of the pin end thread protector, and wherein the size of the hex head of the box end thread protector is about 50 to 80 percent of the diameter of the closed end of the box end thread protector.

13. The thread protection assembly of claim 10 wherein the protectors are made of polypropylene.

14. The thread protection assembly of claim 10 wherein the box end thread protector is hollow.

15. The thread protection assembly of claim 10 wherein the cylinder of the box end thread protector has an upper unthreaded portion that forms a circular flange having a greater diameter than the threads of the box end thread protector.

16. The thread protection assembly of claim 10 wherein the cylindrical sleeve of the pin end thread protector defines an interior and wherein the hex head of the pin end thread protector extends downwardly from the closed end into the interior.

17. The thread protection assembly of claim 10 wherein the closed ends of the protectors are recessed.

18. A thread protection assembly for protecting the exposed threads on a pin end and a box end of a section of pipe attached to a coupling, the assembly comprising:
  (a) a pin end thread protector comprising:
    (i) a cylindrical sleeve with internal threads adapted to mate with exposed external threads on a pin end of a pipe;
    (ii) an open end; and
    (iii) a closed end having an outwardly projecting hex head that is recessed within the cylindrical sleeve; and
  (b) a box end thread protector comprising:
    (i) a cylinder with external threads adapted to mate with exposed internal threads on a box end of a coupling; and
    (ii) a closed end having an outwardly projecting hex head that is recessed within the cylinder.

* * * * *